Nov. 21, 1950 E. DANNER 2,530,511
GLASS SEVERING MEANS AND PROCESS
Filed Feb. 16, 1948 11 Sheets-Sheet 1

Fig.1

INVENTOR.
EDWARD DANNER
BY
OBERLIN & LIMBACH
ATTORNEYS.

Nov. 21, 1950 E. DANNER 2,530,511
GLASS SEVERING MEANS AND PROCESS
Filed Feb. 16, 1948 11 Sheets-Sheet 3

INVENTOR.
EDWARD DANNER
BY
OBERLIN & LIMBACH
ATTORNEYS.

Nov. 21, 1950 E. DANNER 2,530,511
GLASS SEVERING MEANS AND PROCESS
Filed Feb. 16, 1948 11 Sheets-Sheet 5

INVENTOR.
EDWARD DANNER
BY
OBERLIN & LIMBACH
ATTORNEYS.

Nov. 21, 1950 E. DANNER 2,530,511
GLASS SEVERING MEANS AND PROCESS
Filed Feb. 16, 1948 11 Sheets-Sheet 9

INVENTOR.
EDWARD DANNER
BY
OBERLIN & LIMBACH
ATTORNEYS.

Nov. 21, 1950 — E. DANNER — 2,530,511
GLASS SEVERING MEANS AND PROCESS
Filed Feb. 16, 1948 — 11 Sheets-Sheet 10

INVENTOR.
EDWARD DANNER
BY
OBERLIN & LIMBACH
ATTORNEYS

Nov. 21, 1950     E. DANNER     2,530,511
GLASS SEVERING MEANS AND PROCESS
Filed Feb. 16, 1948     11 Sheets-Sheet 11

INVENTOR.
EDWARD DANNER
BY
OBERLIN & LIMBACH
ATTORNEYS.

Patented Nov. 21, 1950

2,530,511

UNITED STATES PATENT OFFICE 2,530,511

GLASS SEVERING MEANS AND PROCESS

Edward Danner, Newark, Ohio

Application February 16, 1948, Serial No. 8,567

13 Claims. (Cl. 49—48)

The present invention relates generally, as indicated, to a glass severing means and process, and more especially to a severing means (including the process performed thereby) which, in association with a drawing or feeding means continuously delivering elongated glass or like stock thereto in rod or tubular form from a forming apparatus, is operative to sever such stock into desired predetermined lengths.

Severing means of this general character (see for example my prior Patent 1,220,201, dated March 27, 1917) essentially involve mechanisms for continuously feeding the stock to the severing means and for shifting a transversely disposed scoring tool carried by the latter at predetermined intervals longitudinally in unison with and laterally into engagement with the stock whereby to form an incision or score mark in the stock at which the stock is weakened in a transverse plane and at which weakened portion of the stock severing is effected upon application of lateral pressure on a portion of the stock in advance of such incision, such incision as is well known in the art creating a peripheral stress concentration line in a plane perpendicular to the longitudinal axis of the stock.

However, it has been well recognized by those skilled in the art of designing, building, and operating such severing means that a difficult problem exists with respect to the effecting of clean square breaks of the stock particularly in instances where the stock is traveling at a high rate of speed. Such prior art severing means are open to the further objection that application of lateral pressure on the stock without more and about a fixed fulcrum is not conducive to the production of uniformity of the breaks in the ends of the stock whereby the trimming of the jagged ends involves added expense and waste of material.

Accordingly, a primary object of this invention is to provide a glass severing means and process which through the following enumerated and other expedients as will appear contributes toward the achievement of uniform and efficient severing of glass stock moving at a high rate of speed into accurate and clean cut lengths:

(1) Reduce the mass of the reciprocating scoring tool assemblage to a minimum;

(2) Essentially restrict the movements of such assemblage to a cushioned longitudinal reciprocation while effecting engagement between the scoring tool and the stock by laterally shifting the latter;

(3) Provide a moving fulcrum accurately positioned relative to the incision formed in the stock;

(4) Provide multiple scoring tools for effecting plural incisions at circumferentially spaced points on the larger sizes of stock;

(5) Simultaneously impose tension on the stock during application of lateral pressure thereon;

(6) Employ a novel form of universal drawing or feeding means which does not require adjustment but yet accommodates a wide range of stock sizes and which is so coupled with the severing means that the base line of the stock fed to the latter bears a fixed relation thereto; and (7) Arrange the scoring tool and the lateral pressure and tensioning devices so that the latter are brought into action during and immediately after the stock has been scored whereby there is no opportunity for appreciable relief of stress concentration.

Briefly outlined, the severing means and process constituting the present invention has associated therewith and preceding the same, first, a glass melting furnace and a forming apparatus wherefrom the glass in a viscid state is drawn at a predetermined uniform lineal speed by drawing or feeding means which is preferably located a convenient distance, viz. 200 feet or more from said forming apparatus dependent upon the size of stock drawn, speed of draw, temperature of the glass, and other factors, the stock intermediate of said forming apparatus and drawing means being supported by conveying rolls such as are commonly used and well known in the art. At this stage of the operation the glass stock while yet in a heated state is sufficiently solidified so as not to be deformed by frictional engagement between the pads and saddles which form a part of said drawing means, said drawing means in addition to drawing the stock from the forming apparatus being operative to continuously feed the stock to the severing means whereat it is shifted laterally into engagement with a scoring tool (or tools on larger sizes of stock) whereby said tool forms a score mark or incision in the stock to weaken a localized portion of the stock in a transverse plane. At the same time a moving fulcrum is provided for the stock opposite such score mark or at the weakened portion. As a component of the severing means there is provided a mechanism which is operative to simultaneously apply lateral pressure and tensile pull on the stock in advance of the score mark to thus effect a square clean break of the stock at the score mark about said moving fulcrum.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

With the foregoing general structure and process in mind, reference will now be made specifically to the several figures of the drawings in substantially the same sequence as the success stages through which the stock passes after being drawn from the forming apparatus.

Figure 1:
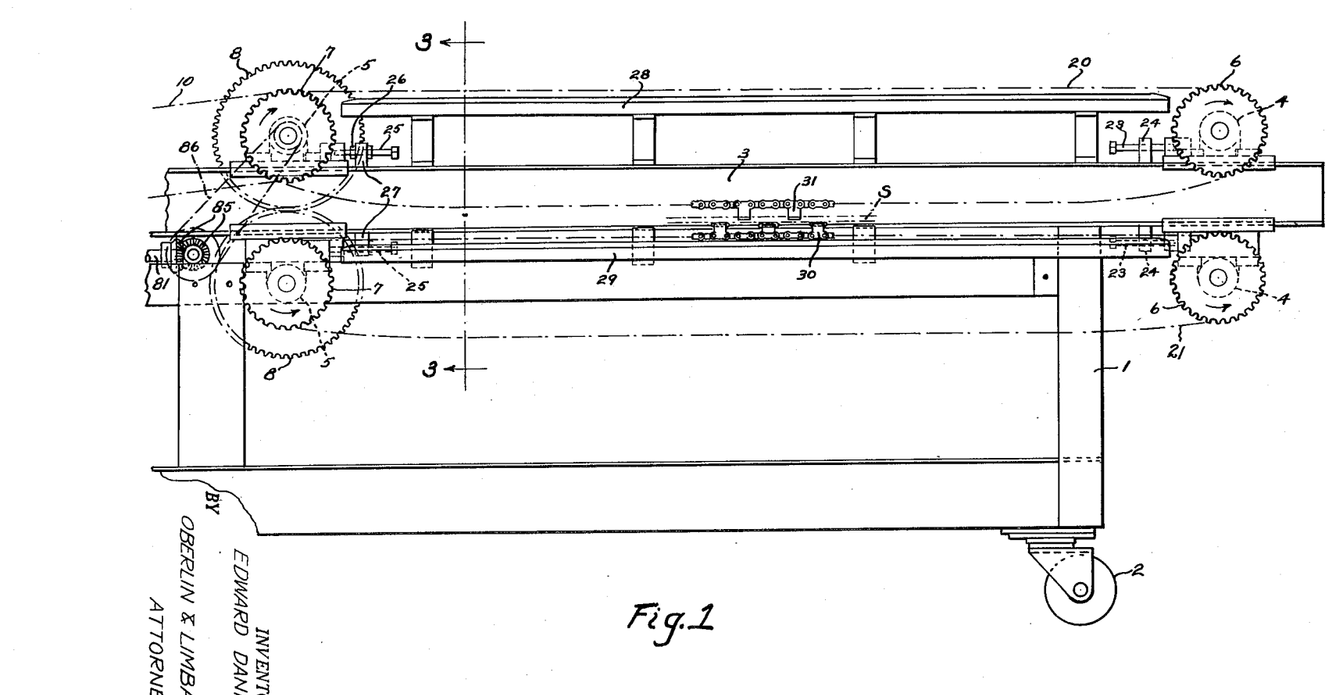
Figs. 1 and 2 are side elevation views of contiguous portions of one embodiment of my invention.
Figure 2:
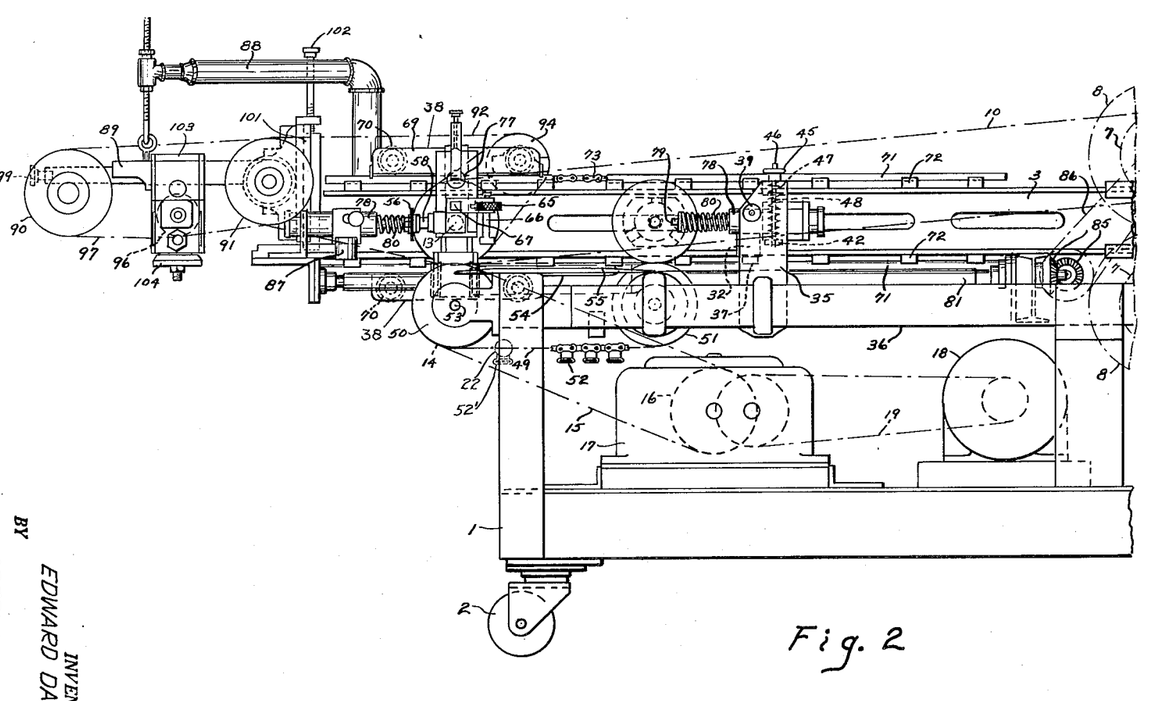
Figure 3:
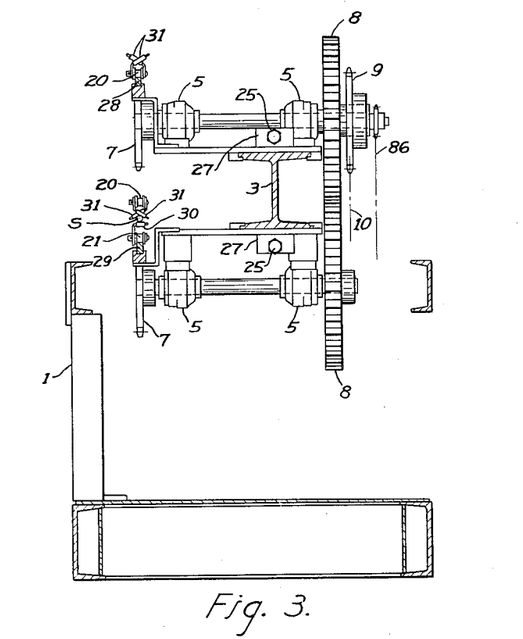
Fig. 3 is a cross section view taken substantially along line 3—3, Fig. 1.

Therefore, reference will first be made to the drawing or feeding means as illustrated in Figs. 1 and 3. Said drawing means is supported on a longitudinally extending framework 1 contiguous portions of which are shown in Figs. 1 and 2 including castors or wheels 2 at each end for enabling convenient movement thereof. As previously indicated, the drawing means is located a convenient distance from a glass melting furnace and a forming apparatus and adjacent a suitable intermediate roller conveyor or the like, and is operative to draw the stock at a predetermined lineal speed from the forming apparatus for delivering the stock to a severing means.

Along the upper surface of the framework 1 is a primary member 3 carrying a pair of longitudinally adjustable brackets 4 at one end and another like pair of brackets 5 intermediate the ends thereof, said brackets providing bearings for shafts connected to the idler sprocket wheels 6 and for shafts connected to driven sprocket wheels 7, all four of said sprocket wheels lying in a common vertical plane. Power for driving the sprocket wheels 7 in the direction indicated by the arrows is derived as by a pair of meshing gears 8 respectively keyed on the shafts of wheels 7, a sprocket wheel 9 secured to the same shaft as the upper one of said gears 8 and a sprocket wheel 11 keyed on the upper of parallel shafts 13 and 53 with an endless chain 10 trained over wheels 9 and 11 (see Figs. 2, 3, and 4), meshing gears 12 respectively keyed on shafts 13 and 53, and sprocket wheels 14 and 16 having an endless chain 15 trained thereover, said wheel 14 being keyed on the lower shaft 53 and said wheel 16 being mounted on the power take-off shaft of the variable speed unit 17 (see Figs. 2 and 4) supported on a shelf on the framework 1 below the primary member 3. Said unit 17 is conveniently driven as by an electric motor 18 through a V-belt and pulley drive 19.

Longitudinal adjustment of the brackets 4 along the primary member 3 for varying the distance between the upper pair of sprocket wheels 6 and 7 and between the lower pair of sprocket wheels 6 and 7 and thus for adjusting the tension of the endless chains 20 and 21 respectively trained over such pairs of sprocket wheels is effected as by screws 23 having threaded engagement with lugs 24 on said member and having their ends engaging the brackets 4 which support the idler sprocket wheels 6. On the other hand, longitudinal adjustment of the brackets 5 which carry the driven sprocket wheels 7 relative to the driving means therefor is effected as by screws 25 having threaded engagement with said brackets 5 and being locked in adjusted position as by lock nuts 26 adapted to be drawn against the lugs 27 on said primary member 3.

Between the upper and lower pairs of sprocket wheels 6 and 7 are longitudinally extending chain guides 28 and 29 respectively for guiding the upper sides of the respective chains 20 and 21.

Carried by the lower chain 21 are a series of pads 30 presenting along its upper side a flat faced moving table for supporting the stock S adapted to be carried thereon, said pads being preferably covered with asbestos or like heat-resistant friction material. Carried by the upper chain 20 are a corresponding series of asbestos-covered saddles 31 arranged so as to be disposed intermediate the pads 30, alternate saddles 31 being inclined in opposite directions as best shown in Fig. 3 so as to provide an aligning effect on the stock S passing between the lower side of chain 20 and the upper side of chain 21. Thus there is provided a three-point support of the stock so that the same is retained in a direct line with the severing means presently to be described.

It will be observed that even though the axes of the sprocket wheels 6 and 7 are fixed vertically relative to one another and to the framework 1, nevertheless said drawing means is capable of handling any of a wide range of sizes of stock, viz. from the smallest diameter to 2⅛ inch diameter or larger, such universality being made possible by providing sufficient sag in the lower side of the upper chain 20 so that the saddles 31 thereon contact the stock S supported by the pads 30 on the lower chain 21. For the larger sizes of tube or rod stock a larger number of saddles 31 will engage with the stock and because of the greater length and thus weight of chain 20 raised thereby, a greater drawing or feeding force will be effected, while for the smaller sizes of stock which require a lesser drawing force a fewer but sufficient number of saddles 31 will engage with the stock. Because the moving table formed by the pads 30 is flat, the base lines of all sizes of stock will bear a fixed relation to the framework 1 and to portions of the severing means located in advance of the drawing means.

The operation of the drawing means will now be understandable from the foregoing detailed description of its construction. When the stock S is placed between the aforesaid lower and upper sides of the chains 20 and 21 respectively, the same will be frictionally engaged between the pads 30 and saddles 31 and thereby be advanced from right to left as viewed in Fig. 1 at a uniform rate of speed as determined by the speed of rotation of the driven sprocket wheels 7, such speed being desirably varied through proper adjustment of the variable speed unit 17. From said drawing means the stock S is continuously fed to the severing means now to be described in detail, said severing means being mounted on the other end of the framework 1 and essentially built around the primary member 3.

From said drawing means the stock passes between a pair of freely rotatable and preferably vertically disposed guide rolls 32 which are carried by a bracket 35 clamped on the upper side of member 36 of the framework at a position immediately preceding the severing means, said bracket being provided with a transverse guideway for the shaft members 37 on which said rolls are rotatable. Adjustment of the distance between said rolls 32 is accomplished as by a screw 38 formed with lefthand threads engaged with one of the shaft members 37 and with righthand threads engaged with the other of said shaft members 37 whereby rotation of said screw as by a knob 39 effects simultaneous movement of the shaft members 37 so that the median line between said rolls 32 will coincide with the axis of the stock. Movement of said shaft members is preferably effected through springs 40 so that the guide rolls will yieldably engage the stock therebetween to thus accommodate variations in the size of the stock passing therebetween.

Said bracket 35 is further provided with a vertically adjustable bar 42 having its leading edge above the stock and bevelled as shown so as to deflect the end of the stock downward for passage between the rolls 32, vertical adjustment of said bar being effected as by a nut 45 threadably engaged with a screw 46 attached to said bar and projected through a leg 47 on said bracket. An interposed spring 48 renders said bar so that it may be yieldably forced upwardly when the occasion arises.

The stock after passing between the guide rolls 32 is supported on a moving table formed by the upper side of an endless chain 49 trained over sprocket wheels 50 and 51, said chain having thereon a series of flat faced pads 52 like those on the previously described lower chain 21 on the afore-described drawing means. Said chain 49 is caused to travel at the same speed as the stock by the sprocket wheel 50 which is keyed on the lower shaft 53, said shaft being driven by the variable speed unit 17 as previously described. As will hereinafter appear, a roller assemblage 22 on said chain 49 and the associated pad 52' forms a moving fulcrum constantly disposed directly opposite the score mark or incision which is formed in the stock during its movement.

Between the sprocket wheels 50 and 51 is a longitudinally extending cam bar 54 provided with an inclined upper surface 55 engaged during each revolution of the chain 49 by the roller assemblage 22 for thus raising the associated fulcrum forming pad 52' and thus the stock supported thereon, such raising or lateral displacement of the stock, as will be seen, effecting engagement of the stock with a scoring tool so as to form a score mark thereon.

During the raising of the stock as aforesaid, the upper side thereof is transversely scored by the scoring tool 56 which is herein illustrated as a rotary saw (preferably having diamond tipped or like cutting edges suitable for operating on glass) disposed in a plane normal to the axis of the stock, said tool being rotated as by a pneumatic motor 57 having its vacuum or pressure operated rotor shaft 58 keyed to said tool. It has been found desirable to use such a pneumatic motor instead of a separate electric motor or intergearing from the drive unit 17 (or electric motor 18) because of the simplification effected thereby and because of the lightness of the motor 57 as compared with electric motors or gearing, a motor 57 with sufficient power for the present purposes weighing only about two pounds.

Figure 9:
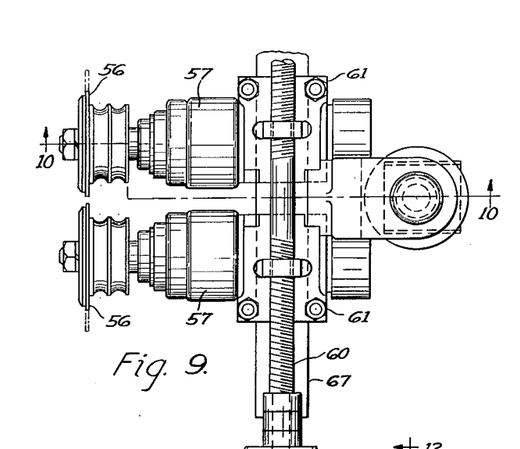
Figs. 9 and 10 are respectively top plan and side elevation views, the latter partly in cross section taken substantially along the line 10—10, Fig. 9, of an assemblage including two scoring tools.
Figure 10:
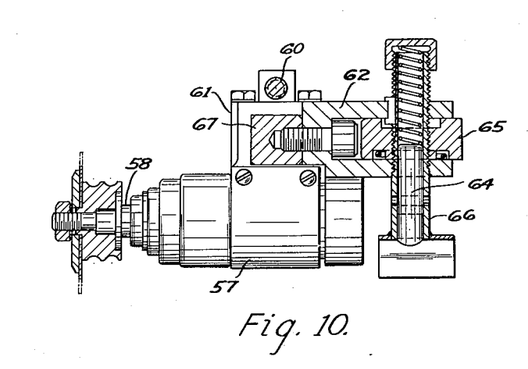
Figure 11:
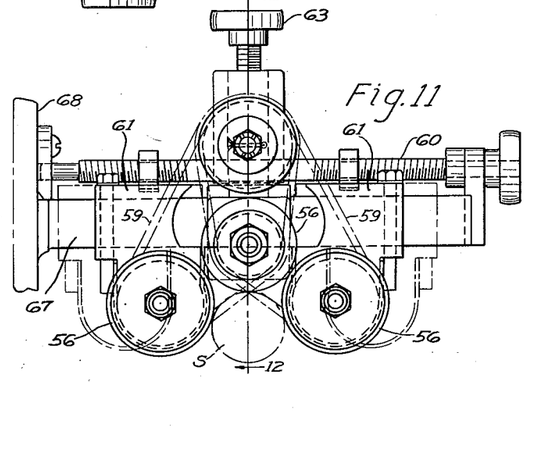
Figs. 11 and 12 are respectively front elevation and cross section views, the latter having been taken along line 12—12, Fig. 11, of an assemblage including three scoring tools.
Figure 12:
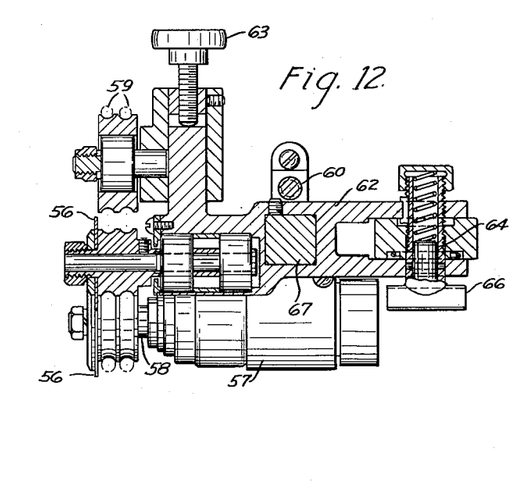

A single scoring tool, while satisfactory for a wide range of sizes of stock, is preferably used only with stock sizes between ⅛ and ¾ inch diameter. For the larger sizes, ¾ to 1½" and 1½ to 2⅛" diameter, it is preferred to respectively use two scoring tools 56 as illustrated in Figs. 9 and 10, and three scoring tools as illustrated in Figs. 11 and 12. In such plural tool arrangements, the cutting edges thereof are coplanar and normal to the stock axis.

In the two tool unit, separate pneumatic motors 57 drive each tool and in the three tool unit, two motors 57 are employed for driving two of the tools with belting and pulleys 59 for driving the third.

With respect to such plural tools it has been discovered that for the larger sizes of stock a cleaner square break can be effected than can be effected when the stock has but a single score mark thereon. In this regard it should further be pointed out that better results are obtained when the stock is scored at circumferentially spaced points than when the stock is formed with a continuous score line around its entire periphery. Although in both of the plural tool arrangements illustrated the score marks are made on the top and sides of the stock it may be desirable in some instances to additionally provide a score mark on the bottom of the stock in which case the tool thereat may operate as a fulcrum.

The tools illustrated in Figs. 9 and 10 and Figs. 11 and 12 are rendered adjustable relative to one another to accommodate the respective ranges of sizes of stock and to take up wear of the tools by means of a screw 60 having left and right hand threads respectively engaged with one of the two tool supports 61 transversely slidably carried on the main base structure 62. In the three tool unit there is a further adjustment of the upper tool vertically by a screw 63. One common feature of each scoring tool assemblage illustrated in Figs. 7-8, 9-10, and 11-12 is the spring pressed guide finger 64 for holding the stock against the table formed by the pads 52 at a point rearwardly of the tool or tools 56 and of the fulcrum provided by said pad 52' under said tool or tools. The yielding of said finger 64 accommodates lumps or other irregularities in the stock. The finger assemblage is vertically adjustable as by an axially fixed knob 65 having threaded engagement with the finger housing 66. In any case, the scoring tool and drive therefor whether of the single or plural form is transversely adjustably carried on a square bar 67 projecting forwardly from a vertically adjustable slide 68 and through the main base 62 of the tool 56, both of the aforesaid adjustments enabling accurate positioning of the tool or tools centrally over the stock S and accurate control of the depth of the score mark or marks formed in the stock.

The slide 68 is preferably made from aluminum or other light weight material and is carried in a longitudinally reciprocating head 69 which is provided with guide rollers 70 at its four corners formed by parallel interconnected arms 38, said rolls being adapted to roll along longitudinally extending bars 71 mounted on the upper and lower faces of the primary member 3 as by a series of blocks 72 and said head 69 being of light weight construction and likewise fabricated from aluminum or like material.

The mechanism for properly reciprocating said head 69 and the tool carried thereby comprises an endless chain 73 of a length equaling that of chain 49 and that of the length to which it is desired to sever the stock and driven at the same lineal speed as that of the stock, said chain 73 being trained over sprocket wheels 74 and 75. Said wheel 74 is keyed on upper shaft 13 which is driven, as previously indicated, through meshing gears 12 respectively keyed on upper and lower shafts 13 and 53, said lower shaft 53 deriving power from unit 17 through sprocket wheels 14 and 16 and chain 15. Said wheel 75, like wheel 51 therebelow, is longitudinally adjustable so as to enable convenient adjustment of the cut lengths of the stock in 1" or 2" increments for example simply by adding or subtracting an appropriate number of 1" links to and from the chains 73 and 49. Reciprocation of said head 69 is effected through a pair of rolls 76 carried by said chain 73, said rolls 76 being engageable in vertically disposed guides 77 in said head.

It is now apparent that with a construction as described, the head 69 will travel longitudinally in unison with the stock along the lower straight portion of the chain 73 while at those portions of the travel where the chain and the rolls 76 carried thereby pass around the sprocket wheels 74 and 75 there will be effected the desired gradual acceleration and deceleration in the longitudinal movements of the head.

To further render the head smooth operating and to minimize shock thereof buffer assemblages 78 are provided adjacent each end of the travel of the head, said assemblages each including a spring actuated plunger 79 which is engaged by said head. It will be observed that in addition to the cushioning effected by the springs 80, the plungers 79 are so fitted into the supports 78 as to define dashpot chambers from which escape of air is sufficiently restricted to create an air cushion.

It necessarily follows that inasmuch as the speed of travel of the head 69 is equal to that of the stock only when the rolls 76 are traveling along the straight path followed by the chain 73 it is at this stage that engagement of the stock with the scoring tool or tools 56 must be effected in order to form a clean score mark in the stock. To the accomplishment of this end, the raising of the pad 52' on chain 49 (through the co-action of the rollers assemblage 22 with cam bar 54) for engaging the stock with the scoring tool 56 is effected during the travel of the latter at a uniform speed in unison with the stock, viz. in the area opposite the straight underside of the chain 73.

It is also evident that disengagement of the stock and the scoring tool 56 must occur prior to the deceleration of the head 69 and such disengaged relation must continue during the entire opposite or return stroke of the head 69 and until the head again moves in unison with the stock on its forward stroke. One convenient means for causing such disengagement is to provide a rotary cam shaft 81 having cams 82 longitudinally reciprocable but non-rotatable thereon said cams cooperating with rollers 83 on an intermediate slide 34 in timed relation to the travel of the head, said slide 34 engaging slide 68 for raising the scoring tool free of the stock prior to deceleration of said head.

Figures 5, 6:
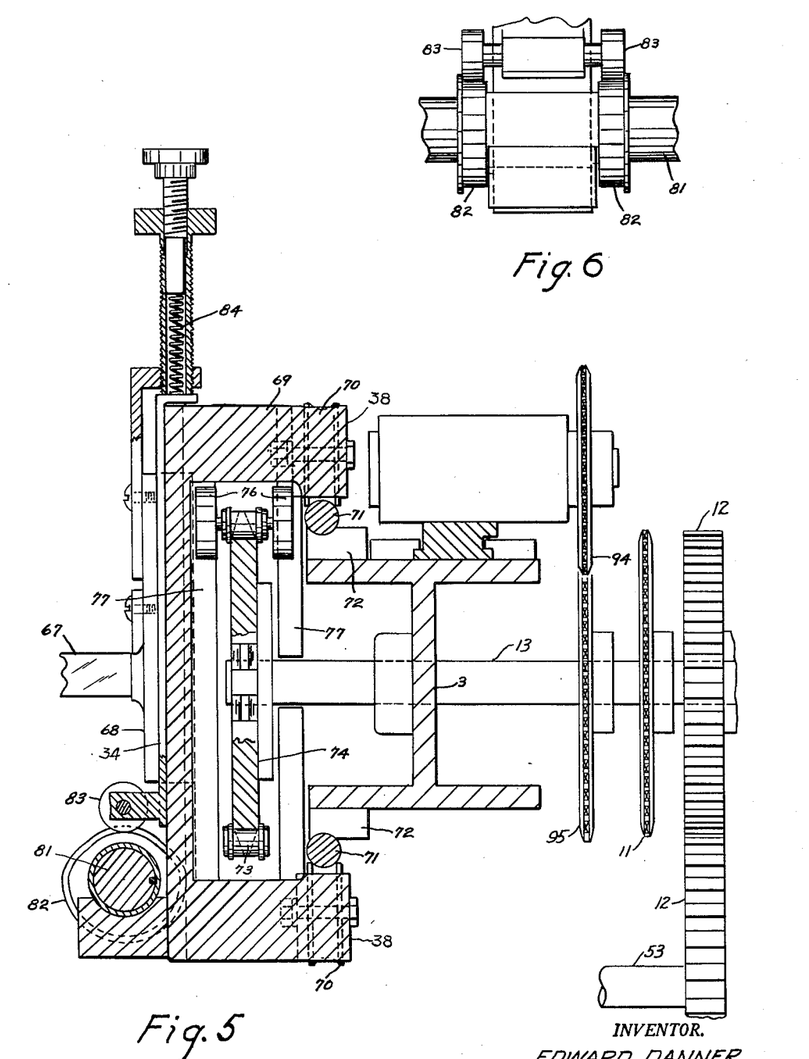
Fig. 5 is a cross section view on an enlarged scale taken substantially along line 5—5, Fig. 4.
Fig. 6 is an elevation view of the lower portion of Fig. 5 as viewed from the lefthand end thereof.
Figure 7:
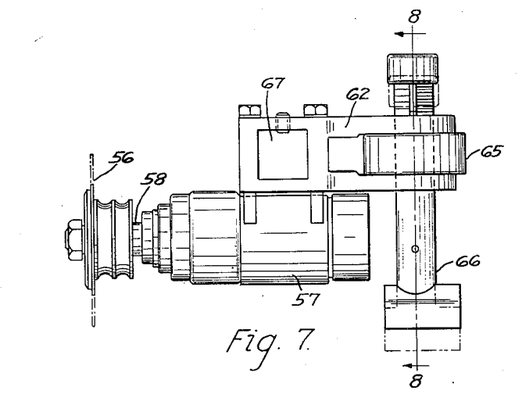
Fig. 7 is a side elevation view of an assemblage including a single scoring tool thereon.
Figure 8:
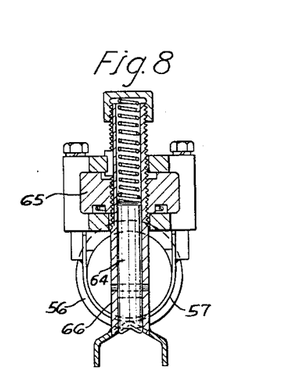
Fig. 8 is a cross-section view taken substantially along line 8—8, Fig. 7.

As best shown in Fig. 5, a spring 84 urges intermediate slide 34 downwardly and consequently tends to raise the slide 68. By properly adjusting said spring 84 the pressure of the tool or tools 56 on slide 68 against the stock may be desirably regulated.

The cam shaft 81 is rotated at a prescribed speed as through meshing bevel gears 85, one of said bevel gears having connection with the same means which drives the sprocket wheels 7 through a wheel and chain assemblage 86. Because the cams 82 are longitudinally slidable on the cam shaft 81 they will reciprocate with the head 69 and constantly be in register with rollers 83 on said slide 68. Said cams 82 and rollers 83 are preferably arranged as shown so that the scoring tool 56 is lowered at a proper time to be engaged by the stock. As just described, the spring 84 interposed between said slide 68 and intermediate slide 34 has the function of causing the tool 56 to score the stock under a controlled pressure to thus prevent jamming or stalling of its air motor 57 and to prevent crushing of thin wall tube stock.

Although it is preferred to employ both the cam shaft 81 and the roller assemblage 22 for the purposes indicated, it may be feasible in some cases to either omit the cam shaft or render it inoperative and form the cam bar 54 so that the assemblage 22 and the pad 52' associated therewith will drop during the straight path movement of the severing tool, to thereby permit the scored stock to disengage from the tool. Still another alternative structure with which satisfactory results may be obtained, as when the stock is traveling at a relatively slow speed is to omit the assemblage 22 in which case the cam shaft 81 operates to raise the scoring tool from the stock after the latter has been scored.

At this stage that is upon removal of the scoring tool 56 away from the stock, the pad 52' on the moving table formed by the pads 52 carried on chain 49 will be directly opposed to the score mark formed in the stock and will move in unison with the stock whereby to constitute a fulcrum about which the end of the stock in advance of the score mark may be laterally bent to thereby effect square clean cracking of the stock in a plane normal to its axis.

After the stock has been scored, the end thereof in advance of the score mark passes between a pair of guide rolls 87 which are constructed similarly to the previous described rolls 32 whereby repetition at this time is deemed unnecessary.

Figure 4:
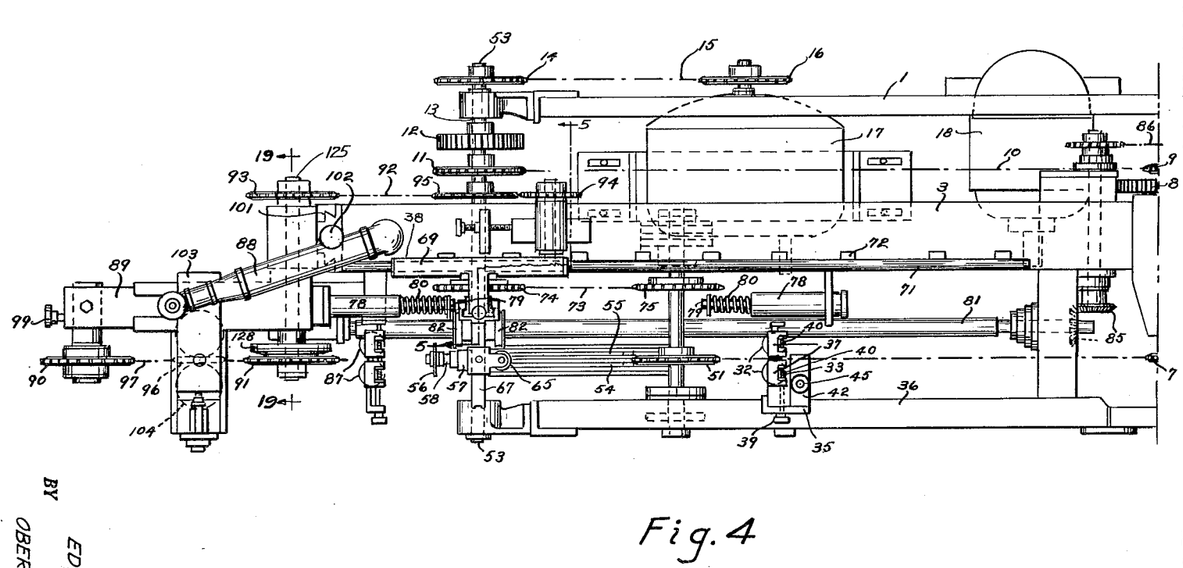
Fig. 4 is a top plan view of the portion of the apparatus illustrated in Fig. 2.

One form of mechanism, as most clearly illustrated in Figs. 13 and 14, for applying lateral pressure on such advance portion of the stock will now be described. Located adjacent the end of the framework 1 and suspended by an arm 88 anchored on the framework is a base 89 rotatably supporting a pair of sprocket wheels 90 and 91, the latter of which is driven through a chain 92 trained over sprocket wheels 93, 94, and 95 on said framework and base, said wheels 91 and 93, as far as the presently to be described lateral pressure applying device is concerned, are keyed on the opposite ends of a spindle 125, with the drive plate 128 as shown in Fig. 4 being omitted. In turn, the wheel 95 is keyed on the upper shaft 13 and is thus driven in the same manner as the wheel 74 on said shaft heretofore described.

There is an intermediate sprocket wheel 96 between wheels 90 and 91 for causing the lower side of chain 97 over the latter wheels to be downwardly inclined relative to the stock. As best shown in Fig. 13, there is a push-down finger 98 carried by said chain 97 which in following the aforesaid inclined path gradually engages the stock to apply lateral pressure on the stock in advance of the score mark or marks and about the moving fulcrum formed by the pad 52′, such fulcrum, as previously indicated, being constantly disposed directly opposite such score mark, the finger 64 within housing 66 serving to hold the rearward portion of the stock against the table formed by the pads 52.

The base 89 carrying the sprocket wheels 90 and 91 comprises plural parts which are longitudinally adjusted as by a screw 99 whereby to enable proper adjustment of the tension on chain 97 and to accommodate different lengths of chain 97 corresponding to the lengths to which the stock is to be severed. Thus, the push-down finger 98 will engage the stock during each revolution of the chain 97 and at the same relative position to the score mark on the stock. The base 89 as a whole is further rendered vertically adjustable for accommodating different sizes of stock as by a dove-tail connection 101 with the frame manipulated by a screw 102. For accommodating this adjustment the bracket carrying the sprocket wheel 94 is longitudinally adjustable on the frame.

The base 89, particularly with regard to a modified mounting of wheels 91 and 93 thereon, will be described in detail later in connection with a modified form of lateral pressure applying mechanism, but for the immediate purpose the structure should be such that wheel 91 is rotated in direct response to rotation of wheel 93.

Figure 14:
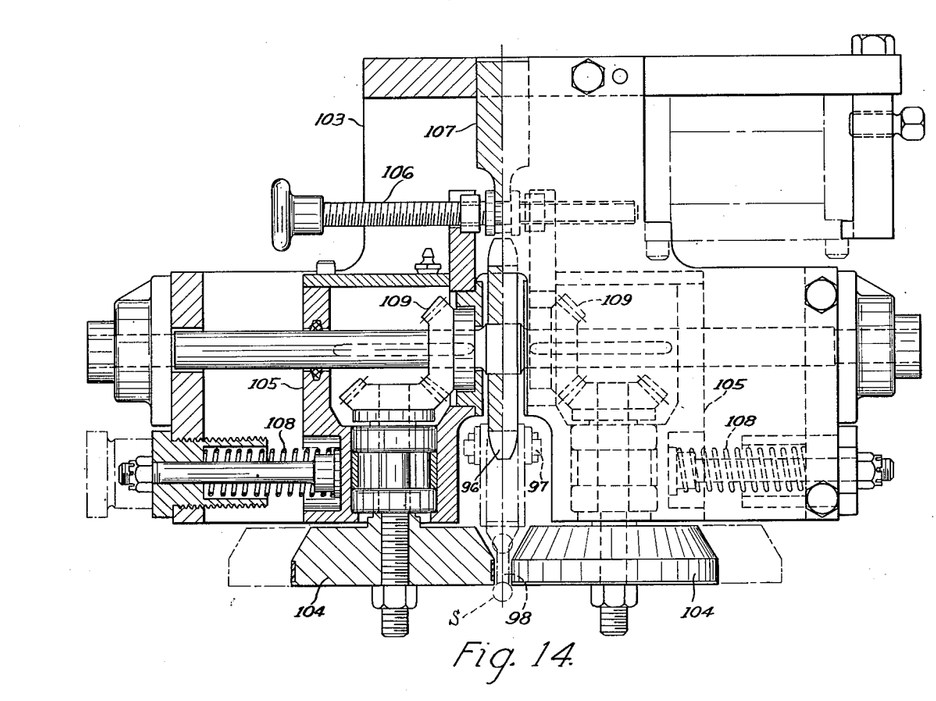

Supplementing the lateral pressure for severing the stock as applied by the push-down finger 98 is a tensioning device 103 which in the form illustrated in Figs. 2, 4, and 14 includes a pair of rubber faced driving rolls 104 adapted to frictionally engage the stock therebetween, said rolls being rotatable in housings 105 which are adjustable toward and away from one another to accommodate different sizes of stock by a screw 106 having lefthand and righthand threads respectively engaging said housings, the screw being fixed axially by a finger 107. Springs 108 are interposed for enabling adjustment of the rolls 104 so as to yieldably engage with the stock therebetween.

Figure 13:
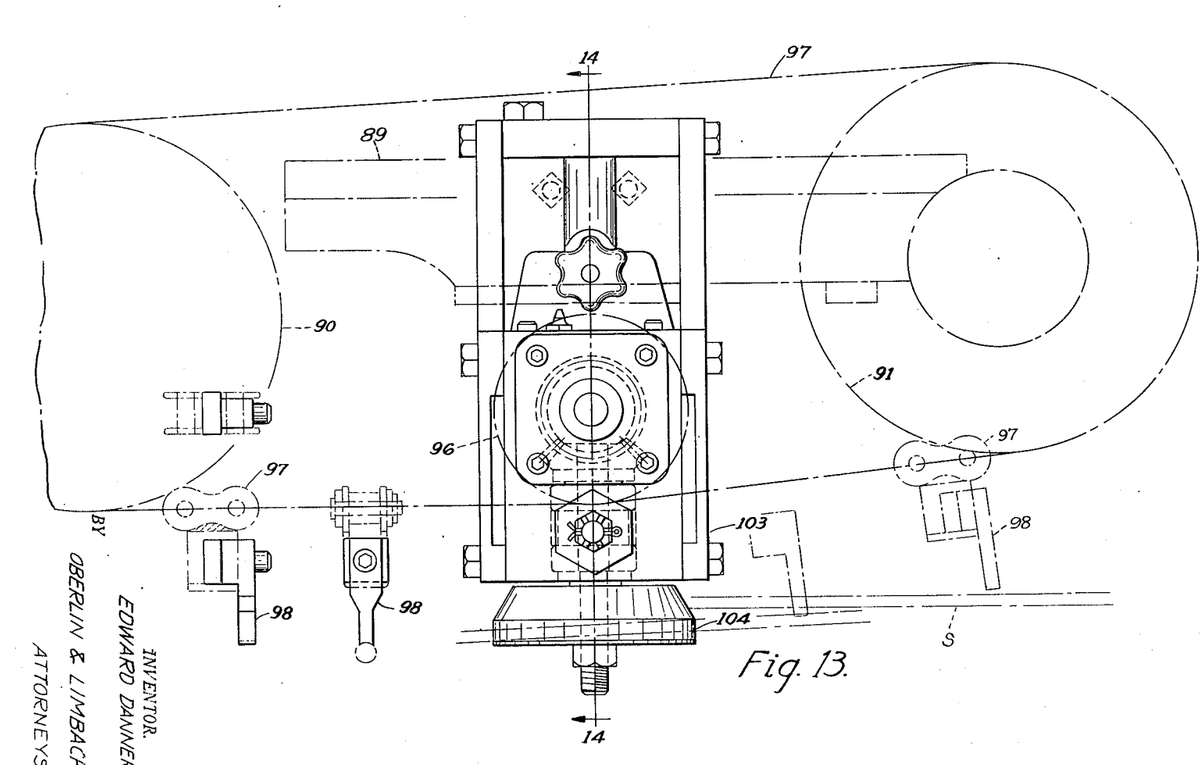
Figs. 13 and 14 are respectively side elevation and partial cross-section views, the latter having been taken along line 14—14, Fig. 13, of one form of mechanism for applying lateral pressure and tension on the stock to be covered.

As illustrated in dotted outline in Figs. 13 and 14, the horizontally disposed stock S initially freely passes between said rolls 104 and then when the finger 98 engages the stock, the advance end thereof is forced into gripped position between said rolls, and finally as the finger approaches a position at or near the device 103, the stock will be ejected by the finger from the rollers. By this time the stock has been severed, whereupon it freely drops into a suitable container or onto a conveyor or the like.

To exert tension on the stock simultaneously with application of lateral pressure thereon, said rolls 104 are driven through sets of bevel gears 109 and sprocket wheel 86 at a peripheral speed exceeding that of the stock whereby the resulting slippage and drag of the rolls on the stock exerts a tensile pull on the stock. Thus, clean severing of the stock is effected by the simultaneous application of lateral pressure and tension on the stock. Furthermore, because such forces on the stock are applied during and immediately following the scoring of the stock, it has been found that cleaner breaks are obtained, such improvement being believed to be attributable to the minimizing of the opportunity of relief of stress concentration in the stock at the score mark or marks.

Figure 15:
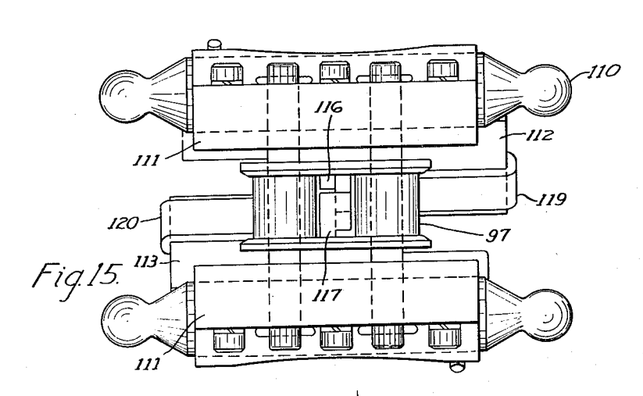
Figs. 15–18 are respectively top plan, side elevation, cross section along line 17—17, Fig. 16, and end elevation views of another form of mechanism for applying lateral pressure and tension on the stock to be severed.
Figure 16:
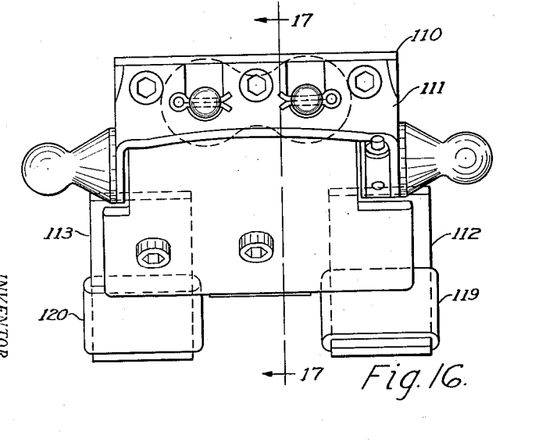
Figure 17:
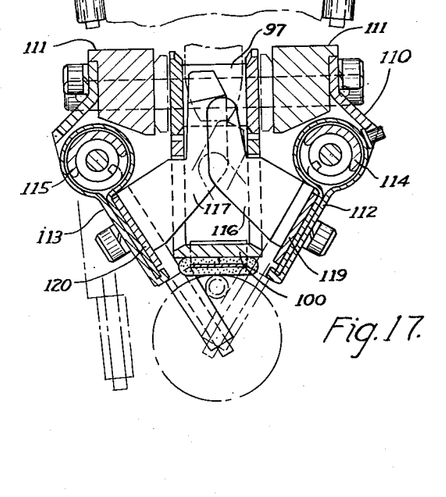
Figure 18:
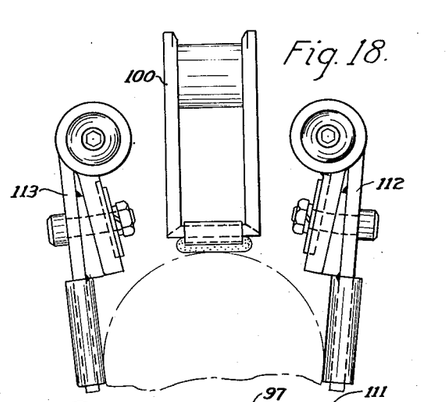

The modified form of lateral pressure and tension applying means illustrated in Figs. 15 to 18 comprises a spring actuated flap member 110 carried by the chain 97 and including a body 111 mounted on said chain to which body opposite flaps 112 and 113 are pivotally connected and yieldably urged toward one another by torsion springs 114 and 115, said flaps being spread apart to straddle the stock by lugs 116 and 117 thereon which are forced downwardly as viewed in Figs. 16 to 18 by the teeth of the sprocket wheels 90 and 91. When the teeth of said sprocket wheels disengage from the portion of the chain 97 carrying the body 111, the springs 114 and 115 will cause the flaps 112 and 113 to close upon and frictionally engage the stock therebetween, the finger portion 100 of said body being operative to apply lateral pressure on the stock as the flap member follows the downwardly inclined path of the lower side of chain 97. In this form of the invention a shoe 118 between the sprocket wheels 90 and 91 guides the lower side of the chain 97 along an inclined path as aforesaid. (See Fig. 20.)

The flaps 112 and 113 are provided with friction facings 119 and 120 thereon so that when said member 110 travels at a rate exceeding the lineal speed of the stock a tensile pull will be exerted on the stock. In order to retain said flap member 110 in register with the stock, the chain 97 is, as previously indicated, of length equal to the lengths to which the stock is to be severed but periodically the same is accelerated and decelerated, acceleration taking place when the flaps 112 and 113 are engaged with the stock and during application of lateral pressure on the stock, and a corresponding deceleration taking place after severing of the stock and release thereof by the flaps 112 and 113.

Figure 19:
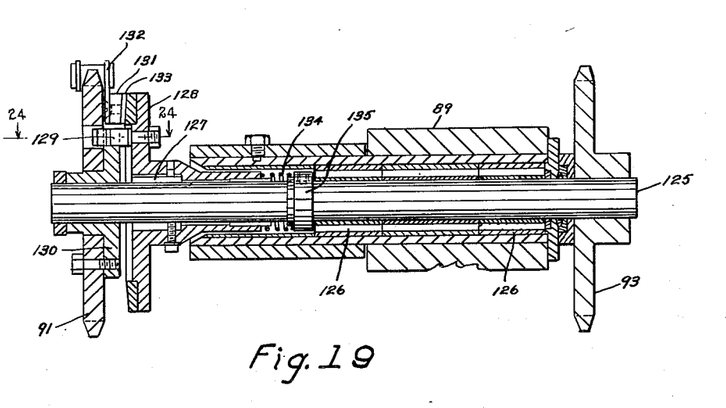
Fig. 19 is a cross-section view taken substantially along the line 19—19, Fig. 4.
Figure 20:
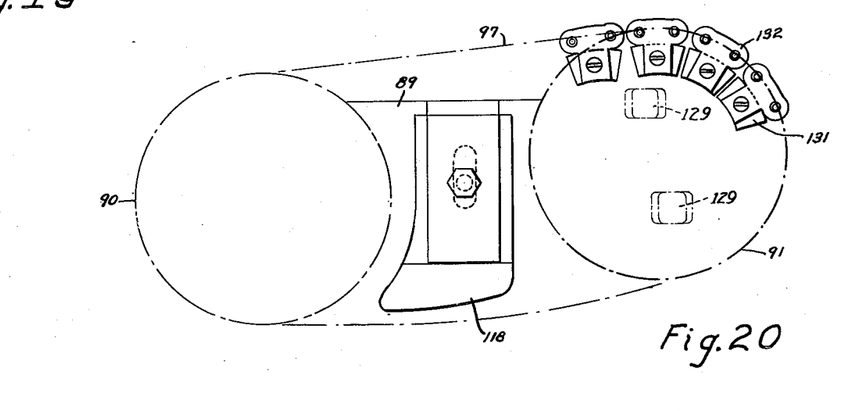
Fig. 20 is a side elevation view as viewed from the lefthand side of Fig. 19.
Figure 24:
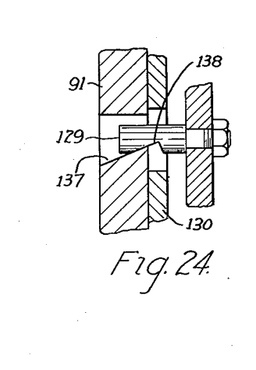
Fig. 24 is a cross-section view taken substantially along the line 24—24, Fig. 19.

The mechanism for causing such acceleration and deceleration is illustrated in Figs. 19, 20, and 24, and comprises a shaft 125 journalled in base 89 as by suitable bearings 126, the sprocket wheel 93 being non-rotatably connected to one end of said shaft and the sprocket wheel 91 being rotatably (but axially fixed) connected to said shaft. Slidably keyed on said shaft adjacent the inner face of sprocket wheel 91 as by the key 127 is a drive plate 128 which is operative through one or more cam blocks 129 connected thereto and projected loosely through openings in the hub 130 and fitted in openings in sprocket wheel 91. The opposed faces 137 and 138 of the openings in wheel 91 and blocks 129 are parallel but inclined as shown in Fig. 24 whereby movement of the blocks 129 to the right effects an advance of the wheel 91 and, conversely, movement of the blocks 129 to the left permits a backing up of the wheel 91.

The means for accomplishing the required acceleration and deceleration of the chain 97 when the flap member 110 is mounted thereon includes a series of cam segments 131 carried at the inner ends of plates 132 on said chain and trailing behind the flap member. Said cam segments 131 are provided with inclined faces 133 so disposed that during travel of the chain 97 over the sprocket wheel 91, such faces progressively force the drive plate 128 away from the sprocket wheel 91 against the pressure exerted by spring 134 compressed between said drive plate and a collar 135 on shaft 125.

As a result of such movement of the drive plate 128, the cooperating cam surfaces 138 and 137 on blocks 129 and wheel 91 effect an acceleration in the clockwise rotation of sprocket wheel 91 as viewed in Fig. 20 whereby the flap member 110, then having already gripped the stock, in traveling along the path of the lower side of chain 97 is operative, as previously described, to exert both a lateral pressure and a tensile pull on the stock.

Now, as the last of the series of the segments 131 disengages from the drive plate 128, the spring 134 will shift drive plate 128 toward the sprocket wheel 91 whereupon the cooperating cam surfaces 138 and 137 on blocks 129 and wheel 91 will change their relative positions, such change being effective to permit deceleration in the speed of rotation of sprocket wheel 91 to thus restore the wheel 91 and drive plate 128 to the relation they bore to one another prior to the acceleration of the former effected by the cam segments 131. The wheel 91 and drive plate 128 will continue to rotate in unison and at the same lineal speed as the stock until the segments 131 again engage said drive plate.

One convenient way of making the segments 131 is to provide a circular ring with one face having the desired inclination and then radially cut one half of said ring into the desired number of segments.

In Fig. 18 there is shown a modification of the flap member 110 with the flaps 112 and 113 arranged for use with the larger sizes of stock (1⅛–2⅛" diameter, for example) whereas the flap member 110 in Figs. 15 to 17 is ideally suited for the smaller stock sizes, viz. from ⅛ to 1⅛" diameter.

Figure 21:
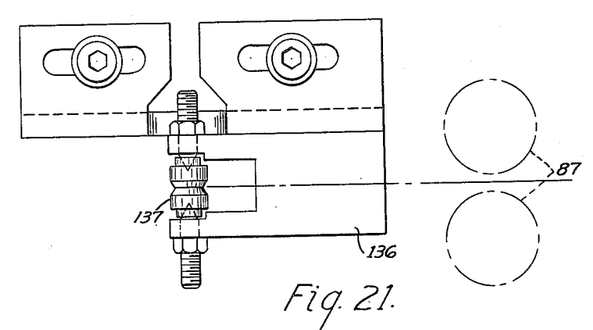
Figs. 21, 22, and 23 are respectively top plan, side elevation, and end elevation views of a breaking mechanism which is adapted for breaking small stock sizes.
Figure 22:
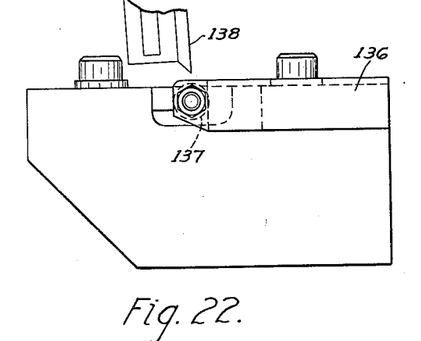
Figure 23:
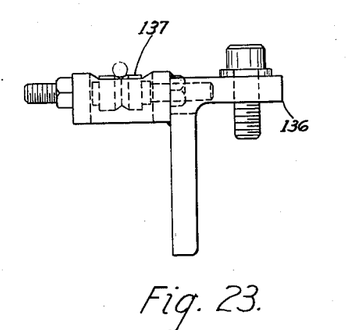

The afore-described scoring mechanisms each contemplate scoring of the stock first followed by exertion of lateral pressure and tension thereon. However, in connection with very small sizes of stock of the order of ⅛ to ¼" diameter, satisfactory results for some purposes may be obtained by a mechanism which merely applies a lateral pressure on unscored stock. Such mechanism as illustrated in Figs. 21 to 23 includes a body 136 having a peripherally grooved roller 137 rotatable thereon over which the stock passes. Above said body and carried as by the previously described chain 97 is a sharp edged finger 138 adapted to engage the stock and follow an inclined path whereby to apply lateral breaking pressure on the stock.

Having thus described the construction of typical embodiments of this invention it is now understandable that in essence the complete operation involves; first, a continuous feeding of the stock to be severed at a uniform predetermined lineal speed toward a severing means; second, a lateral displacement of the stock into engagement with a scoring tool or tools for scoring the stock and thus weakening the stock in a transverse plane; and third, the simultaneous application of lateral pressure and tension on the stock in advance of the weakened portion and about a moving fulcrum supporting the stock at such weakened portion.

Other modes of applying the principle of the invention may be employed, change being made as regards the details described, provided the features stated in any of the following claims, or the equivalent of such, be employed.

I therefore particularly point out and distinctly claim as my invention:

1. Apparatus for severing elongated glass or like stock while moving longitudinally at a predetermined lineal speed, comprising a scoring tool disposed transversely of the stock, means for moving said tool longitudinally in unison with the stock, means operative during such movement to effect engagement between said tool and the stock for forming a transverse score mark on the latter, means for applying lateral pressure on the stock in advance of such score mark, means frictionally engaging the stock in advance of such score mark, and means driving said last named means at a lineal speed greater than that of the stock whereby to exert a tensile pull on the stock while simultaneously applying lateral pressure to thus effect severing of the stock at such score mark, said lateral pressure applying means comprising a movable finger engageable with the stock during movement along a path longitudinal of but inclined relative to the stock.

2. Apparatus for severing elongated glass or like stock while moving longitudinally at a predetermined lineal speed, comprising a scoring tool disposed transversely of the stock, means for moving said tool longitudinally in unison with the stock, means operative during such movement to effect engagement between said tool and the stock for forming a transverse score mark on the latter, means for applying lateral pressure on the stock in advance of such score mark, means frictionally engaging the stock in advance of such score mark, and means driving said last named means at a lineal speed greater than that of the stock whereby to exert a tensile pull on the stock while simultaneously applying lateral pressure to thus effect severing of the stock at such score mark, said lateral pressure applying means comprising a movable finger engageable with the stock during movement along a path longitudinal of but inclined relative to the stock, and said friction means comprising a pair of rollers on opposite sides of the stock and means yieldably urging said rollers into frictional gripping engagement with the stock.

3. Apparatus for severing elongated glass or like stock while moving longitudinally at a predetermined lineal speed, comprising a scoring tool disposed transversely of the stock, means for moving said tool longitudinally in unison with the stock, means operative during such movement to effect engagement between said tool and the stock for forming a transverse score mark on the latter, means for applying lateral pressure on the stock in advance of such score mark, means frictionally engaging the stock in advance of such score mark, and means driving said last named means at a lineal speed greater than that of the stock during a portion of the travel of the former whereby to exert a tensile pull on the stock while simultaneously applying lateral pressure to thus effect severing of the stock at such score mark, said lateral pressure applying means comprising a movable finger engageable with the stock during movement along a path longitudinal of but inclined relative to the stock, said lateral pressure applying means and said friction means comprising a pair of toothed wheels with an endless element trained thereover and with one side of said element disposed alongside the stock, and a spring actuated flap member carried by said element so formed that the flaps thereof are spread apart in response to movement thereof over said wheels and are released for being yieldably urged together to frictionally grip the stock therebetween in response to movement thereof along such one side of said element, the path of the side of said element alongside the stock being such that said flap member engages and applies lateral pressure on the stock.

4. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for moving said fulcrum member longitudinally in unison with the stock, and means for applying lateral pressure on the stock in advance of such weakened portion whereby to sever the stock at such weakened portion and about said fulcrum.

5. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for moving said fulcrum member longitudinally in unison with the stock, means for applying lateral pressure on the stock in advance of such weakened portion, and means for simultaneously exerting a tensile pull on the stock whereby to sever the stock at such weakened portion and about said fulcrum member.

6. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for moving said fulcrum member longitudinally in unison with the stock, and means for applying lateral pressure on the stock in advance of such weakened portion whereby to sever the stock at such weakened portion and about said fulcrum member, said fulcrum member moving means comprising an endless chain carrying said member and having one side disposed alongside and extending generally longitudinally of the stock, and a pair of wheels including a driving wheel over which said chain is trained.

7. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for moving said fulcrum member longitudinally in unison with the stock, and means for applying lateral pressure on the stock in advance of such weakened portion whereby to sever the stock at such weakened portion and about said fulcrum member, said fulcrum member moving means comprising an endless chain carrying said member and having one side disposed alongside and extending generally longitudinally of the stock, a pair of wheels including a driving wheel over which said chain is trained, and cam means causing such one side of said chain to move along a path inclined with respect to the stock whereby said fulcrum member moves along a correspondingly inclined path into contact with the stock and to laterally displace the stock relative to said stock weakening means.

8. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for moving said fulcrum member longitudinally in unison with the stock, and means for applying lateral pressure on the stock in advance of such weakened portion whereby to sever the stock at such weakened portion and about said fulcrum member, said fulcrum member moving means comprising a carrier on which said member is mounted, said carrier being disposed to impart movement to said member alternately in opposite directions generally longitudinally of the stock.

9. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for moving said fulcrum member longitudinally in unison with the stock, means for applying lateral pressure on the stock in advance of such weakened portion, means frictionally engaging the stock in advance of such weakened portion and operative to exert a tensile pull on the stock simultaneously with application of lateral pressure by said lateral pressure applying means, and means for disengaging said frictionally engaged means and the stock after the stock has been severed at such weakened portion and about said fulcrum member by the combined action of said lateral pressure applying means and said frictionally engaged means.

10. The method of severing longitudinally-moving elongated glass and like stock, comprising weakening a localized portion of the stock in a transverse plane during such movement of the stock, providing a fulcrum in contact with one side of the stock at such weakened portion and moving such fulcrum in unison with the stock, and applying lateral pressure on the stock in advance of such weakened portion whereby to sever the stock at such weakened portion and about such fulcrum.

11. The method of severing longitudinally-moving elongated glass and like stock, comprising weakening a localized portion of the stock in a transverse plane during such movement of the stock, providing a fulcrum in contact with one side of the stock at such weakened portion and moving such fulcrum in unison with the stock, and simultaneously applying lateral pressure and tensile pull on the stock in advance of such weakened portion whereby to sever the stock at such weakened portion and about such fulcrum.

12. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for applying lateral pressure on the stock in advance of such weakened portion whereby to sever the stock at such weakened portion and about said fulcrum member, said lateral pressure applying means comprising a pair of wheels including a driving wheel and an endless chain trained over said wheels, said chain having one side thereof moving along a path inclined with respect to the stock, a member carried by said chain disposed to engage the stock and thus apply lateral pressure on the stock when said member moves along such inclined path.

13. In an apparatus for severing elongated glass or like stock during longitudinal movement of the stock and which includes means movable longitudinally in unison with the stock for weakening a localized portion of the stock in a transverse plane, the combination of a fulcrum member for laterally supporting the stock at such weakened portion, means for applying lateral pressure on the stock in advance of such weakened portion, and means for simultaneously exerting a tensile pull on the stock whereby to sever the stock at such weakened portion and about said fulcrum member, said lateral pressure applying means comprising a pair of wheels including a driving wheel and an endless chain trained over said wheels, said chain having one side thereof moving along a path inclined with respect to the stock, a member carried by said chain disposed to engage the stock and thus apply lateral pressure on the stock when said member moves along such inclined path, and said means for exerting a tensile pull on the stock comprising a pair of rolls including a driving roll frictionally engaging the stock therebetween, and means for driving said rolls at a peripheral speed exceeding the lineal speed of the stock, said lateral pressure applying member being disposed to eject the stock from between said rolls after severing of the stock.

EDWARD DANNER.

REFERENCES CITED

The following references are of record in the file of this patent:

UNITED STATES PATENTS

| Number | Name | Date |
|---|---|---|
| 921,828 | Graybill | May 18, 1909 |
| 1,220,201 | Danner | Mar. 27, 1917 |
| 1,580,809 | Brown | Apr. 13, 1926 |
| 1,868,397 | Solomon | July 19, 1932 |
| 2,290,837 | Stuckert | July 21, 1942 |
| 2,303,587 | Snyder | Dec. 1, 1942 |
| 2,306,721 | Forter et al. | Dec. 29, 1942 |
| 2,377,494 | Greene | June 5, 1945 |
| 2,447,962 | Schwalbe | Aug. 24, 1948 |

FOREIGN PATENTS

| Number | Country | Date |
|---|---|---|
| 197,333 | Great Britain | Sept. 1, 1924 |
| 663,910 | France | Aug. 27, 1929 |